Feb. 15, 1944.  N. SANTUCCI  2,341,817
SEWAGE CUTTING OR SHREDDING DEVICE
Filed Feb. 1, 1940  3 Sheets-Sheet 1

INVENTOR.
Nicholas Santucci
BY
ATTORNEYS.

Feb. 15, 1944.  N. SANTUCCI  2,341,817
SEWAGE CUTTING OR SHREDDING DEVICE
Filed Feb. 1, 1940  3 Sheets-Sheet 2
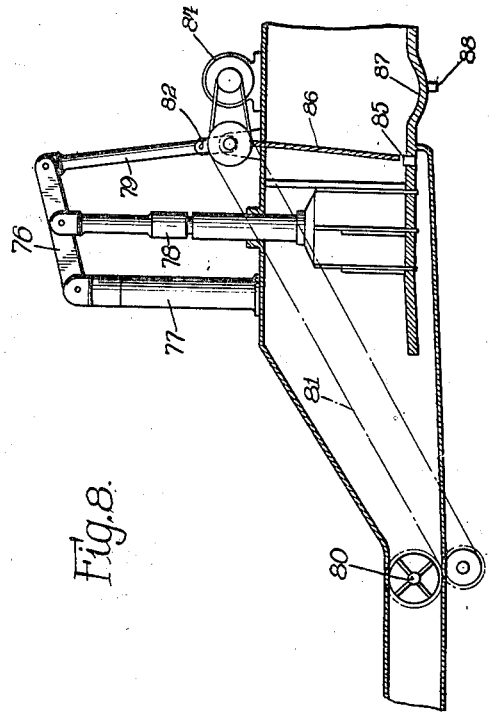
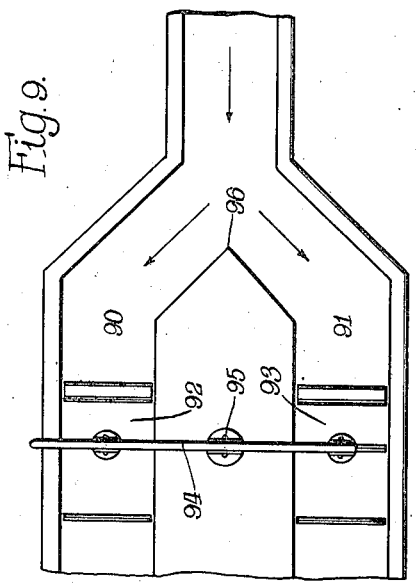
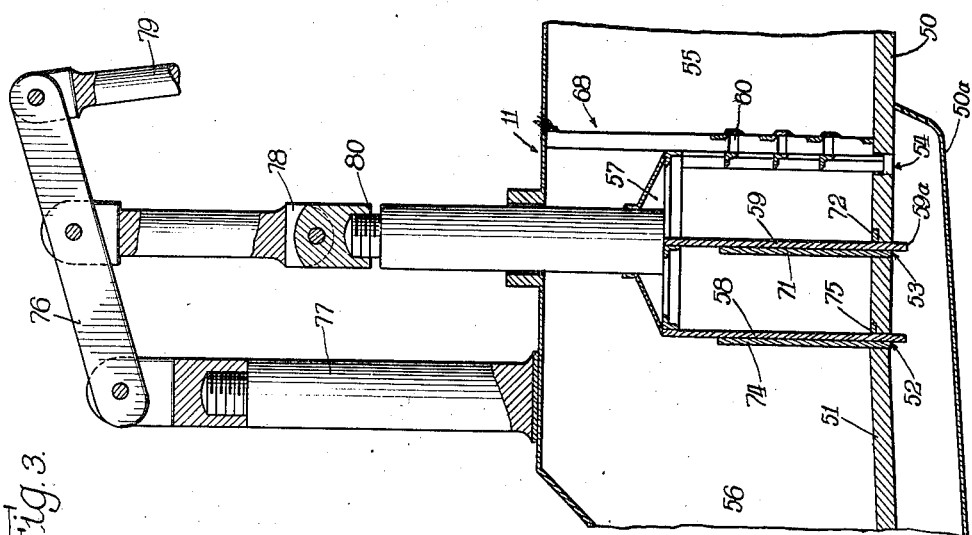
INVENTOR.
Nicholas Santucci
BY
ATTORNEYS Feb. 15, 1944. N. SANTUCCI 2,341,817
SEWAGE CUTTING OR SHREDDING DEVICE
Filed Feb. 1, 1940 3 Sheets-Sheet 3

INVENTOR.
Nicholas Santucci
BY Cromwell Greist & Warden
ATTORNEYS

Patented Feb. 15, 1944

2,341,817

UNITED STATES PATENT OFFICE 2,341,817

SEWAGE CUTTING OR SHREDDING DEVICE

Nicholas Santucci, Niles Center, Ill.

Application February 1, 1940, Serial No. 316,783

2 Claims. (Cl. 210—152)

The present invention relates to sewage cutting or shredding devices and is particularly adapted for use in connection with the influent of sewage before entering a sewage disposal plant.

Before sewage can be satisfactorily treated, particularly if it is to be passed through a pump, it is necessary that it be shredded or cut into relatively small pieces. The cutting of sewage into small pieces has the effect not only of permitting it to pass through pumps or pipes and other mechanical devices without excessive friction or possible damage but, in addition, where sludge treatment is employed the smaller pieces are more easily and effectively treated.

Heretofore various attempts have been made to accomplish this result and a certain degree of success has been achieved with devices of various kinds employing rotary blades or screens. However, a fault with these devices is that they are expensive and difficult to install and, in addition, are subject to jamming and clogging when they encounter rags, string or similar matter in sewage.

The primary object of the present invention is to provide a sludge shredding and cutting device that requires little room, in which the cutting knives are readily interchangeable and which is particularly adapted for the handling of material which has heretofore caused difficulty and been considered hard to shred or cut in the mechanisms now generally in use.

A further object of the invention is the provision of a device which may be driven from the flow through a sewer.

Still another object of the invention is the provision of a device which, because of its inherent characteristics and structure, provides an efficient and convenient by-pass in the event the device for any reason should become clogged or subjected to an excessive flow of sewage to be treated.

In the drawings, two forms of the device are shown. Figs. 1 and 2 disclose one form and Figs. 3 to 7, inclusive, show the second form.

Referring to the drawings in more detail,

Fig. 3 is a view partially in cross section showing a modified form of the device;

Fig. 8 is a schematic sectional view showing one form of the device with means for operating it from the sewage flow as well as other additional features; and Fig. 9 is a sectional view showing two of the devices operated in the divided sewer which has certain advantages as hereinafter described.

Figure 2:
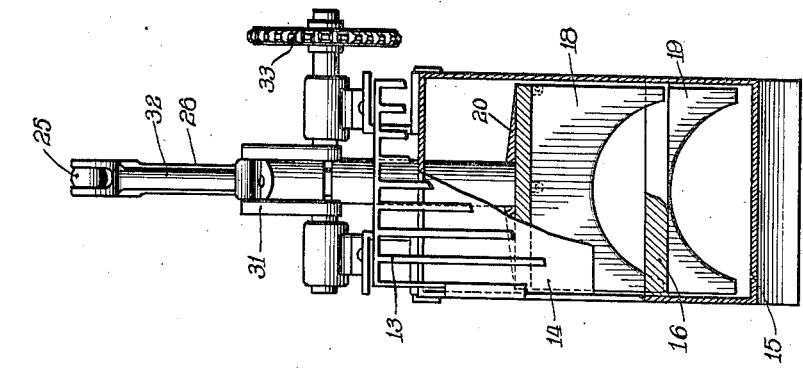
Fig. 2 is a sectional view taken on the line 2—2 of Fig. 1.
Figure 1:
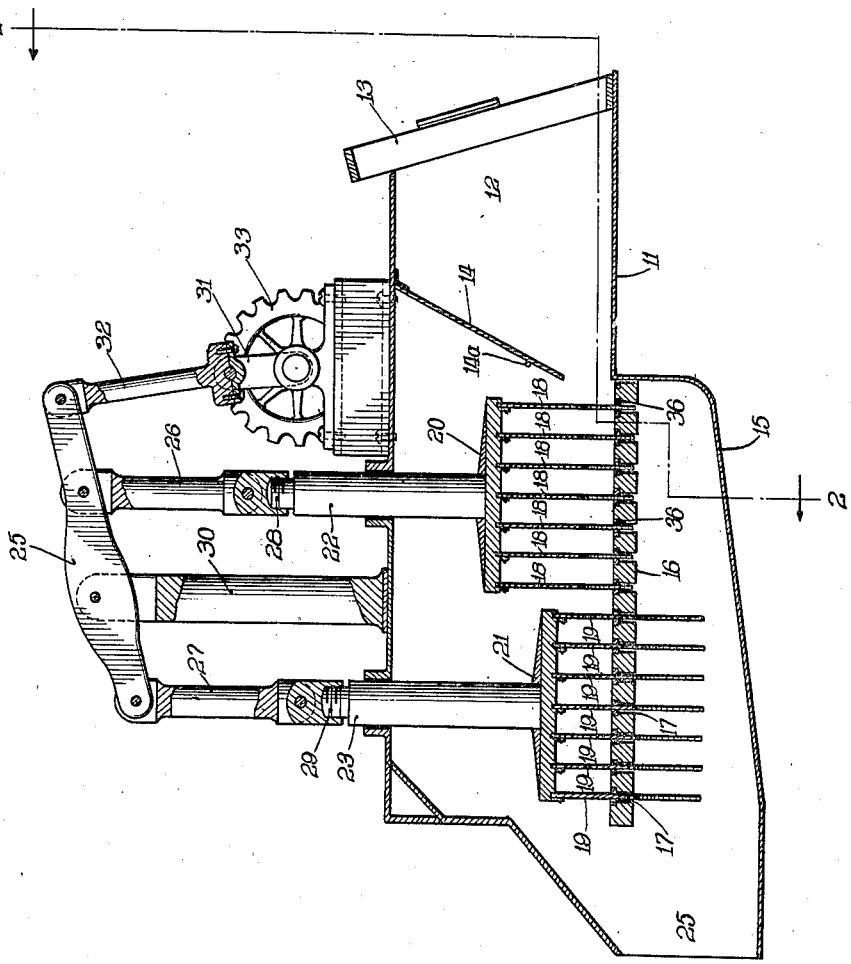
Fig. 1 is a view partially in section and partially in elevation showing the general arrangement of the first form of the device.
Figure 6:
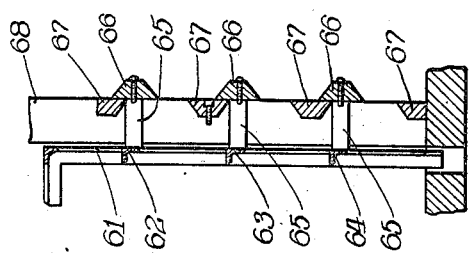
Fig. 6 is a sectional view taken on the line 6—6 of Fig. 4.
Figure 7:
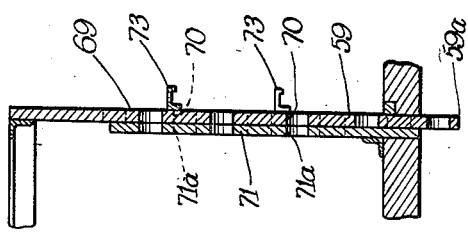
Fig. 7 is a sectional view taken on the line 7—7 of Fig. 5.

In the form shown in Figs. 1 and 2, the device consists generally of a housing or casing 11 which is provided with an inlet 12. Over the inlet is mounted a coarse bar screen 13, the purpose of which screen is to screen out matter such as large blocks of wood or the like. The screen 13 is so coarse as to permit the ordinary objects found in sewage to pass therethrough. Mounted within the housing 11 is a hinged baffle plate 14 which is adapted to direct the influent downwardly and toward an opening in the cutting element hereinafter to be described. A stop 14a is provided to limit the inward movement of the baffle plate 14.

The housing 11 is provided with an offset bottom portion 15. Directly above the offset bottom portion 15 is a bed 16 provided with a plurality of openings 17 that extend across the bed. The number of openings 17 will depend upon the size of the installation and the rate at which it is desired to operate the cutting knives 18 and 19.

The two sets of knives 18 and 19 are respectively mounted on heads 20 and 21, said heads being attached by means of spindles 22 and 23, respectively, to a rocker arm 25. The connection between the heads 22 and 23 to the rocker arm 25 consists of a pair of screw-threaded arm members 26 and 27 which are pivotally mounted on the rocker arm 25 and connected by means of said screw threads that are indicated by the reference characters 28 and 29 to the spindles 22 and 23. The spindles 22 and 23 pass upwardly through the casing 11 and, as will be apparent, the position of the knives 18 and 19 in the bed 16 is regulated by means of the screw threads 28 and 29. The rocker arm 25 is supported by means of a supporting member 30 on which said rocker arm 25 is pivotally mounted.

The knives 18 and 19 are adapted to reciprocate in guillotine fashion through operation of the rocker arm 25. In order to actuate the rocker arm a bell crank 31 is provided that is attached to the rocker arm by means of an arm member 32 which arm member is pivoted to the rocker arm 25 and the bell crank 31. Rotation of the bell crank 31 is achieved through means of the sprocket 33 which is fixedly secured to the bell crank 31 and may be driven by means of a link chain from any suitable source of power.

The knives 18 and 19 are arcuately shaped at their base as indicated in Fig. 2 so that their extreme edges throughout the operation of the device are always located within the slot 17 on the bed 16 and as the knives are reciprocated the edge portion passes through the slot 17 cutting the material between the edge of the knife and the edge of the slot.

Cutting edges 36 are provided along the edges of the slot so as to insure a good cutting edge between the knives and the slot.

The two sets of knives 18 and 19 on the respective heads 20 and 21 are so reciprocated in relation to each other that as one set of knives has passed through the slots the other set will be in raised position.

In operation, the sewage passes underneath the knives 17 and 18 and the liquid and fine particles drains down through the slots 17. The remaining matter, which is too large to pass through the slots 17, is chopped by the knives and pushed through the slots 17.

The capacity of the device is preferably such that by the time the sewage has passed through the first few knives of the second set it will be completely shredded and all of it will have passed through the slots.

In the event there is excessive flow due to abnormal conditions, such as heavy rains or some other abnormal cause, the excessive amount of sewage water will by-pass over the top of the knives and on out through the exit of the device indicated by the reference character 25.

In the construction of the device the top plate is preferably made separable from the side wall so that the top may be lifted off carrying with it the entire knife mechanism, thereby permitting replacement or repair conveniently and easily.

It is apparent that material which would clog a rotating device will have no effect upon this device as there is nothing for it to wind around and become entangled with as the guillotine action of the knives cuts everything that comes beneath it. Furthermore, since the thrust of the cutting edges of the knives is downward it is next to impossible to damage the knives as occurs when difficult or hard materials come into engagement with arms or the like, such as are common in devices heretofore in use.

In Figs. 3 to 8, inclusive, is shown a modified form of the invention. In this form there is employed the same general type of casing, indicated by the reference character 50.

A bed plate 51 is provided over the offset portion 50a of the casing 50. In the form shown this bed plate is provided with three openings, 52, 53 and 54, respectively, which extend across the bed plate. The inlet end of the device is indicated by the reference character 55 and the exhaust end by the character 56. A coarse screen may be used at the inlet end although generally it will not be found necessary. A reciprocating head 57 is provided to which is attached three separate cutting instrumentalities 58, 59 and 60, respectively. The cutting instrumentality, indicated generally by the reference character 60, consists of a frame member 61 having three cross bars 62, 63 and 64. The frame member 60 is secured to the head 57 and reciprocates therewith. Projecting outwardly from the cross bars 62, 63 and 64 are a plurality of supporting members 65 which support double edged cutting knife members 66. It will be apparent that reciprocation of the head 57 causes the knife member 66 to move up and down. A plurality of stationary knife members 67, which are complementary to the reciprocating knife members 66, are securely mounted in an outer stationary frame 68 which is made of upright square bars.

It will be apparent that as the sewage approaches the inlet it will pass through the reciprocating knives 66 and be partially cut by a shearing action as the knives 66 reciprocate and pass over the edges of the stationary knives 67.

Figure 4:
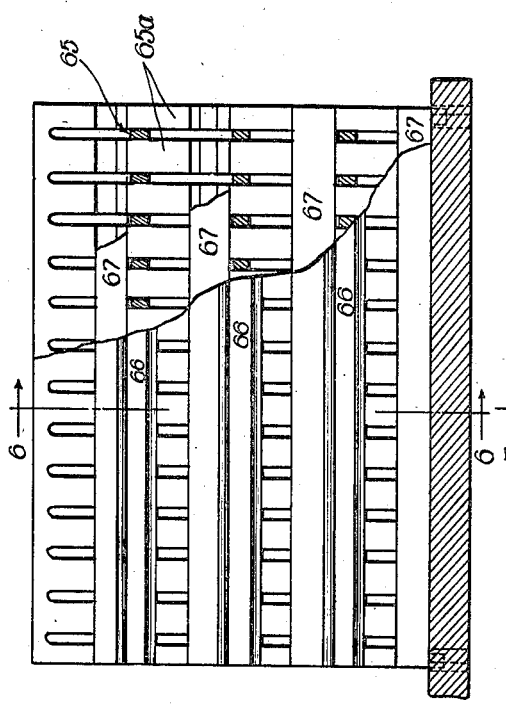
Fig. 4 is a detail sectional view showing part of the cutting knives of Fig. 3.

As is shown in Fig. 4, the knife-supporting members 65 pass between upright bars 65a which act as guides for the knife supports as well as a coarse screen member. The reciprocation of the knife supports 65 maintains the members 65a in a clean condition and prevents an undue accumulation of sludge at this point. Matter caught by the screen will be comminuted by the knives.

Figure 5:
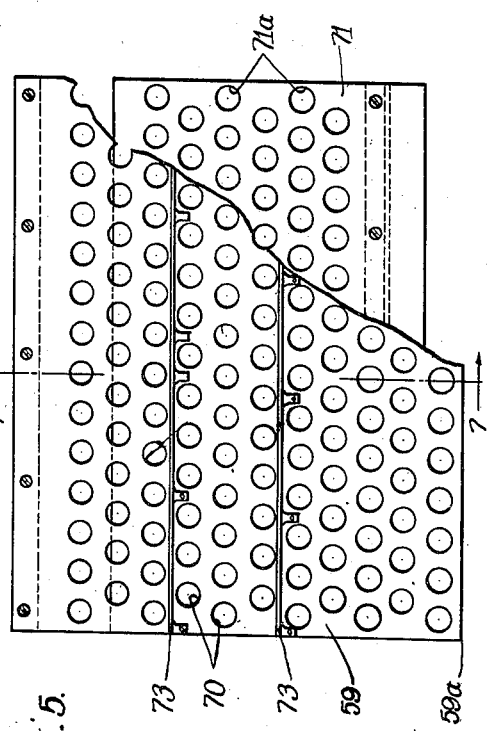
Fig. 5 is a detail sectional view showing the secondary cutting knives of the device shown in Fig. 3.

The sewage then passes to the reciprocating knife member 59 which consists of a blade provided with a plurality of holes 70 as shown in Fig. 5. The blade 59 is in complementary relationship to a fixed blade 71, which blade is also provided with holes 71a that are adapted to register with the holes 70 in the blade 59.

The bottom of the blade 59 is provided with a cutting edge 59a which is shown in the drawings as being straight but may be circular in shape if desired. The cutting edge 59a cooperates with the fixed cutting edge member 72. Provided along the inlet wall of the blade 59 is a plurality of agitator members 73 which tend to agitate and stir up the influent and cause it to readily clear through the holes 70.

The cutting blade 58 is similar in construction to the blade 59 and is provided with a fixed complementary cutting backing member 74 as well as a fixed complementary cutting edge at the base thereof, indicated by the reference character 75.

The cutting element is operated by means of an arm member 76 which is pivotally and adjustably mounted on a post 77. The pivotal arm member 76 is connected to the cutting element through means of an adjusting link 78. Actuation of the arm member 76 is accomplished through means of a driving connection to any suitable source of power which is generally indicated by the broken off arm member 79.

The extent of the stroke of the cutting members is easily adjusted through means of the screw-threaded adjustment in the post 77 and the distance of stroke in either direction is adjusted through means of the screw-threaded connection 80.

It is apparent that the device is adapted to be readily removed for the purpose of replacement of parts as the screw-threaded member 80 may be unscrewed and the driving head 57 and the cutting members removed as a unit.

In the drawings no particular opening has been shown for removal of these parts as in manufacture the type and position of the opening will depend upon convenience for the particular installation.

It will be apparent that the number of cutting members employed may be varied as well as the number of knives. Likewise the different types of cutting instrumentalities may be interchanged or their positions changed without departing from the spirit and scope of my invention.

In the operation of the form of device shown in Figs. 3 to 8, the long, stringy material found in sewage will be cut by the knives 66 and 67 as well as very coarse matter will be subject to their action. The material will then pass to the knife 59 where that which is relatively fine will pass into the openings 70 and be sheared by the blades 59 and 71. Any material which is extremely difficult will be forced downwardly until it reaches the cutting edge 72 where it will be forced past this cutting edge, being cut on the way by and thence into the offset portion 53. The same action occurs at the knife 58.

Various means of driving the device referred to may be employed. Where there is sufficient flow in the sewer line if it is desired to employ means operated by the flow of the sewage, such means may consist of a water motor 80 shown in Fig. 8 which is connected through means of a sprocket chain 81 or other form of drive to the bell crank lever 82 which will drive the device.

It is generally desirable to have available auxiliary power in the form of an electric motor 84 which will be cut into or out of the circuit, depending upon the rate of speed at which the water motor is operating. The electric motor may be made readily responsive to the rate of speed of operation by providing a governor on the water motor, which governor is adapted to control a switch for energizing the motor 84.

The relationship between the governor and the water motor is such that when the governor slows down the switch will be closed and thereby connect the electric current to the motor to cause the device to operate.

As shown diagrammatically in Fig. 8, a plug valve 85 may be provided. This valve is controlled through means of an upright stem 86 which passes through the upper part of the casing. The purpose of such a valve is to permit the ready removal of the sand, gravel and grit which has the tendency to accumulate in front of the cutting knives.

A further function of this plug valve is to by-pass the flow in the event it is desirable to work within the casing for the purpose of changing or repairing the knife structure. Due to the turbulence of the flow immediately in front of the knives this valve will be very effective in washing out accumulations of sand, gravel and the like.

In addition to the valve 85 it may be desirable, in some installations, to provide a grit chamber 87 which accumulates the grit and sand and is emptied at intervals through a flap valve diagrammatically indicated at 88. The material removed from the grit chamber may be directed to any convenient form of receptacle, such as a sand or gravel bed.

In Fig. 9 is shown a construction consisting of a double channel 90 and 91 respectively. In each channel is mounted an appropriate cutting member 92 and 93. The cutting members are actuated by a common rocker arm 94 which is pivotally mounted at 95. It will be apparent that rocking of the arm 94 will cause the cutting knives to be reciprocated. The advantage of this structure is that it causes turbulence of the influent at the dividing point 96 and, furthermore, affords a safety factor in the event it is desirable to put one of the cutters out of operation by providing valves not shown in the drawings in each of the channels 90 and 91 respectively.

A further advantage of the arrangement shown in Fig. 9 is that in certain installations that are subject to periods of overload the normal load may be carried by one of the cutters and at the time of overload the other may be connected in for operation.

Devices constructed in accordance with the invention have the advantage in that they are readily accessible, simple, economical and are positive in their action since the cutting stroke is short and the stresses resulting from cutting are in line with the application of the power for driving the device.

I claim:

1. In a sewage comminuting device, a conduit for a flowing body of sewage, a stationary cutting member having a plurality of spaced openings and being provided with cutting edges adjacent said openings mounted in said conduit in the path of flow of sewage, a movable member mounted adjacent said stationary cutting member and having cutting edges movable past the cutting edges of said stationary member, a platform directly beneath and adjacent said stationary cutting member, said platform having an opening adjacent said stationary cutting member, said movable member having a portion adapted to project into said opening, baffle means mounted on said movable member for agitating sewage adjacent said member, and means for reciprocating said movable cutting member.

2. In a sewage comminuting device, a conduit for a flowing stream of sewage, a stationary frame having elongated openings therein positioned in the path of flow of a sewage stream, cutting bars secured to the front face of said frame and positioned transversely of said elongated openings, a movable member positioned adjacent to said stationary frame and at the back thereof, means connected to said movable member and passing through the elongated openings in said stationary frame, cutting knives secured to said last mentioned means at the front face of said stationary frame, said cutting knives being positioned in cutting relationship to said cutting bars, means for reciprocating said movable member to cause the edges of said cutting knives to cross the edges of said cutting bars in both directions whereby said cutting knives and said cutting bars are brought into and out of cutting engagement.

NICHOLAS SANTUCCI.